Sept. 21, 1965 C. D. NESTLERODE 3,208,045

REMOTE INTERROGATION DECODING CIRCUITRY

Filed Dec. 22, 1960

INVENTOR.
C. DALE NESTLERODE
BY
OSTROLENK, FABER, GERB & SOFFEN
ATTORNEYS

United States Patent Office 3,208,045
Patented Sept. 21, 1965

3,208,045
REMOTE INTERROGATION DECODING CIRCUITRY

Clifford Dale Nestlerode, West Covina, Calif., assignor to Standard Kollsman Industries, Inc., Melrose Park, Ill., a corporation of Illinois Filed Dec. 22, 1960, Ser. No. 77,569
2 Claims. (Cl. 340—171)

This invention relates broadly to interrogation circuitry, and more particularly relates to novel simplified decoding circuits for transmitted multiple pulsed signals.

In a system of numerous dispersed receivers, as in a pay-television service, it is requisite to establish utilization data on each receiver for proper billing. Where such is established from the central broadcasting station, an individual coded signal is assigned each remote receiver. Transmission of coded pulses, without notice by the customer on screen or speaker, provides a selective telemetering arrangement. With each receiver containing a present decoding circuit, a reply signal is returned to the station when its particular code is broadcast. The present invention is directed to reliable and relatively inexpensive selective decoding circuitary.

It is the primary object of the present invention to provide novel pulsed signal decoding circuitry Another object of the present invention is to provide novel decoding circuitry containing an individual tuned circuit for each code pulse assigned to any one receiver and readily adapted for recording.

A further object of the present invention is to provide novel decoding circuitry utilizing a relatively sensitive response circuit section for each coded pulse designated, and a composite trigger circuit operable solely upon simultaneous response to all the designated pulses.

These and other objects of the invention will become more apparent from the following description of an exemplary embodiment thereof, illustrated in the drawings, in which.

Figure 1:
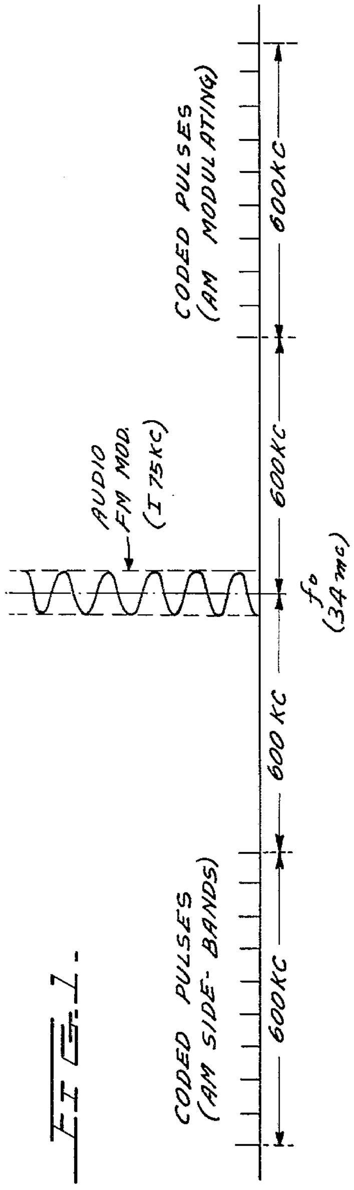
FIGURE 1 is a diagram of a transmitted channel showing code pulse modulation positions.

The invention principles and circuitry are applicable to various systems of transmission, as well as receiver type or application. In FIGURE 1, $f_0$ represents the basic carrier frequency which may be broadcast along a cable network or through space. Further, a basic audio channel, as for stand-by music and announcements, frequency modulates (as FM) the carrier $f_0$. The code pulses in the exemplary system are positioned at 600 to 1200 kilocycles from $f_0$ and amplitude modulates the carrier wave (as AM); with two usual side bands, as shown in FIGURE 1.

In a typical pay-television system for a sizaable community, each subscribed station would contain a four-unit pulse code of discrete frequencies selected from twenty basic "tones." In the herein proposed 600 kilocycle AM band on the $f_0$ carrier, each "tone" would be separated at 31.5 kilocycles. Each "tone" therefore would be at a distinctive predetermined frequency value, detectable on an AM basis, without interfering with the FM audio broadcasting on the same carrier.

The 31,500 cycle separation of the code "tones" permits practicable selectivity in their utilization for decoding. A suitable carrier frequency for such dual purpose is 34 megacycles. Details as to such dual FM-AM system, and demodulation circuitry therefor, are contained in the copending patent application Serial No. 146,524 filed October 20, 1961 for "Dual Modulation Broadcasting System," assigned to the assignee of this case.

The central transmitter successively impresses four-tone combinations on the carrier $f_0$, corresponding to individual assigned subscriber codes. The purpose of broadcasting such successive coded signals is to interrogate all the subscriber receivers on a regular basis, and establish an automatic "reply" from those operating on the fee programs. When the four-tone combination of a particular received comes through to it, its decoding circuitry, to be set forth, registers and triggers a reply signal that returns to the central office in the interval before the next coded-tone broadcast.

The interrogation system hereof thus can rapidly scan all the subscriber stations, and accurately and automatically determine those 'buying" any program being broadcast. The reply information may be directly fed to a punch card billing system. The number of subscriber codes available from a four-tone combination of twenty basic tones is equal to:

$$\frac{20\times19\times18\times17}{1\times2\times3\times4}=4845$$

The system is to have separate return signal lines for each group of 4845 subscribers. With 50 return lines, the 4845 codes will handle 242,250 subscribers by having each return line make its own recording. A large customer list would necessitate more basic tones and/or tones used per subscriber code or more return lines. Such interrogation and reply arrangement is non-mechanical at the subscriber end, requires no code-cards or coins to operate the receiver or "buy" programs. It is inexpensive, effective, and foolproof.

Figure 2:
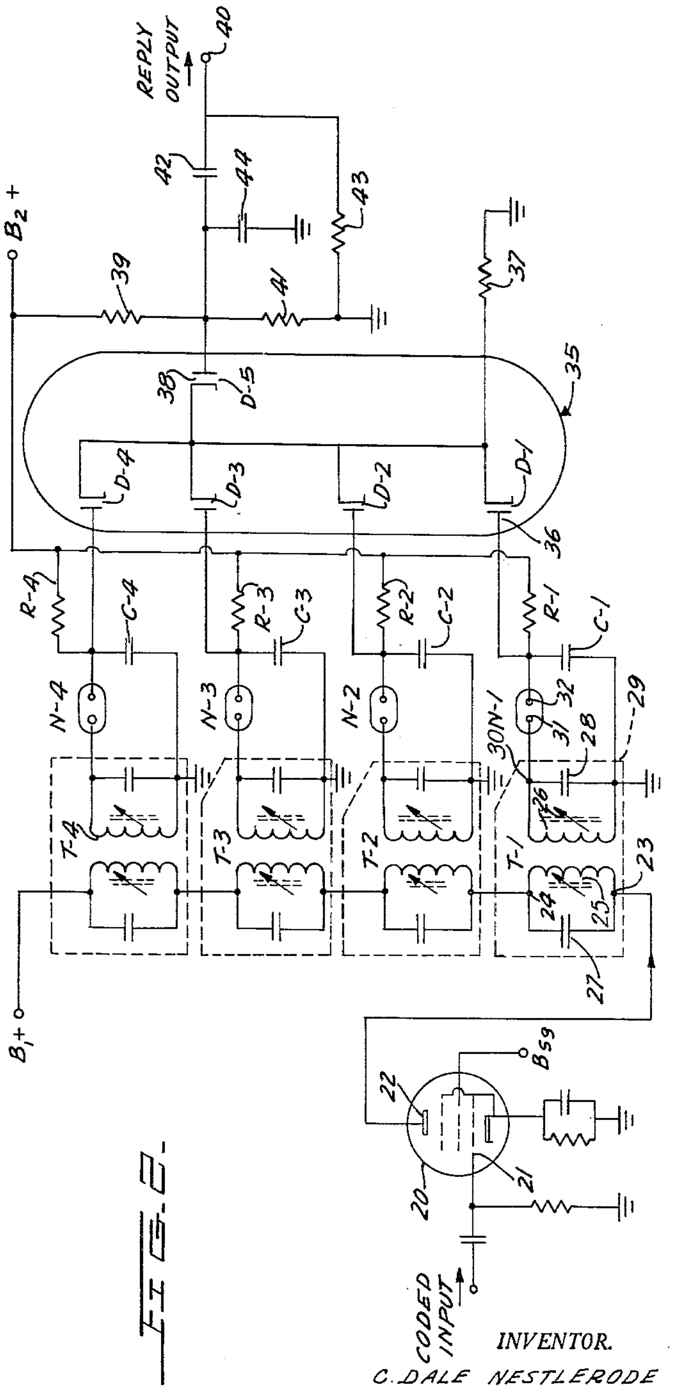
FIGURE 2 is a schematic circuit arrangement of the exemplary decoding system.

The four-tone pulses that are broadcast as set forth above, are received and demodulated in each subscriber set, and thereupon impressed upon the input grid electrode 21 of the driver stage 20 of the decoder circuit shown in FIGURE 2. The screen grid of driver stage 20 is connected to a suitable potential $B_{sg}$. The output anode 22 connects to one side 23 of the primary winding 25 of double tuned, high Q, transformer circuit T–1. Transformer T–1 has a fixed condenser 27 across its primary winding 25; and another condenser 28, across its secondary winding 26. Also each winding 25, 26 has an individual tunable slug, as indicated, for selective tuning-in of the transformer T–1 circuit to a predetermined one of the "tones" being broadcast. Each "tone" transformer set (as T–1), including its coupled windings 25, 26 and shunt condensers 27, 28 is desirably in the form of a plug-in shielded unit, as in a metal can indicated at 29, to permit ready code-changes.

There are four individual "tone" transformers T–1, T–2, T–3, T–4, each tuned in to a predetermined "tone." Their primary windings (as 25 of T–1) are all connected in series (as points 23, 24), on through a common anode source of potential $B_1^+$ and constitute the output load for tube 20. Each tone transformer T–1 . . . T–4, is tunable and adjusted to the assigned four unit tone code for the subscriber, as will now be understood by those skilled in the art. Each tone-tuned transformer T–1 . . . T–4 responds sensitively to only its preset tone frequency; its primary circuit (as 25, 27) transmitting the amplified coded tones to the next transformers in line, for simultaneous response where indicated.

The output terminal of each transformer unit T–1 . . . T–4 (as point 30 of T–1), connects to an electrode (as 31) of a small neon bulb N–1 . . . N–4. The other neon bulb electrodes (as 32) are all connected to a common source of potential ($B_2^+$) through an individual high ohmage resistor R–1 . . . R–4. A fixed condenser C–1 . . . C–4 connects to each neon bulb N–1 . . . N–4 respectively, and ground, forming a series R–C network with corresponding resistor R–1 . . . R–4 between $B_2^+$ and ground. Suitable values for the resistors R–1 etc. are one megohm each; for the condensers C–1 etc., 1,000 mmfd. With the value of $B_2$+ adjusted to apply 110 volts D.C. to the neon bulbs at their corresponding terminals 32, the neon bulbs present, in effect, an "open" or high impedance circuit to their R-C networks R–1, C–1 etc., as well as to the multiple-diode tone detector 35.

The neon bulb will fire at 130 volts across its terminals. The D.C. voltage of 110 volts is applied to one electrode (as 32) and the other electrode is grounded for D.C. through the transformer (as T–1) secondary (as 26). When the negative half cycle of the tone frequency exceeds 20 volts, the combined D.C. plus A.C. will exceed the firing potential. Once firing occurs, the discharge will be maintained until the 110-volt charge on the 1000 mmfd. capacitor (as C–1) drops to approximately 70 volts, the extinguishing potential of the neon bulb.

The positive voltage across each tone detector capacitor (C–1, etc) is also applied to an anode of a five-diode electron tube 35, such as the type 5FJ8, which has a cathode common to all five anodes. The common cathode connects to ground through a large value resistor 37, such as 6.8 megohms. In the absence of tone code signals, all four anodes being positive, conduct and make the cathode potential practically equal to the anode potentials of 110 volts. When one code tone, corresponding to the frequency of one of the tone transformers (as T–1), causes discharge of the associated tone detector capacitor (as C–1) through the neon bulb (as N–1) and transformer secondary winding, the sudden decrease of the positive anode potential of the associated diode (as D–1) causes this diode to stop conducting. Since the other three diodes are still conducting, the change in potential of the common cathode is relatively small. The one diode which stopped conducting remains non-conductive for a period required to recharge the 1000 mmf. capacitor (as C–1) through the resistor (as R–1) from the voltage source $B_2$+. This period is very long compared to the time used to transmit four consecutive bursts of code tones. Therefore, when the four code tones corresponding to the tuned frequencies of T–1, T–2, T–3, T–4 are transmitted in consecutive order, all four diodes will become non-conductive simultaneously and the common cathode potential will drop to zero. Ohm's law shows that the drop in cathode potential when one, two, or three diodes stop conducting is 1.2, 4, and 10.7 volts respectively. The fifth diode D–5 is back biased by the voltage divider formed by resistors 39 and 41 to keep it non-conductive until the common cathode potential drops below approximately 75 volts. Therefore, no reply output appears across resistor 43 unless all four diodes (D–1 through D–4) are driven to the non-conductive state by a code burst corresponding to the four tuning frequencies of T–1, T–2, T–3 and T–4. The clipper diode D–5 is biased so as not to respond to any combination of pulses other than due to all four occurring together. Decoding thereby results for the preset code at the receiver.

The reply pulse is suitably shaped by the R-C network 41, 42, 43, 44, or any equivalent one. The reply signal may thereupon be impressed upon a local amplifier that in turn actuates a local oscillator. The oscillator signal, when triggered, is then directed to be transmitted to the central station. The interval of response or "reply" to the received coded interrogation bursts from the station is small, and timed to be completed before the next coded interrogation burst is transmitted for another subscriber.

The status of reception of the local receiver, on the program involved is thus electrically ascertained without interference with the program content. Reference is made to a copending patent application for a suitable reply circuit useable with the present invention, Serial No. 77,384, filed December 21, 1950, for Reply Circuitry for Remote Interrogation Systems, assigned to the assignee of this case.

Modifications in the circuitry and/or application of the herein described invention may be made without departing from the spirit and scope thereof as defined in the following claims.

I claim:

1. Selective receiver circuitry for decoding signal waves transmitted at a plurality of discrete frequencies in coded combination comprising individual pretuned sections each responsive to a particular one of said signal frequencies, a gaseous discharge tube in circuit connection with each of said sections, means for biasing said tubes to a first state near to their discharge voltage and maintaining individual ones of said discharge tubes in said first state in the absence of a responsive signal from its respective pretuned section; individual ones of said discharge tubes switching to a second state, corresponding to the firing thereof, responsive to the reception of its discrete frequency at its respective pretuned section, a diode individually connected with each of said discharge tubes whereby each section when energized with a signal at its pretuned frequency switches its gaseous discharge tube to its second state for altering the current through its corresponding diode and actuating said diode to a signal responsive condition, and detection means in circuit with all of said diodes to provide an output signal when all of said diodes are actuated to their signal responsive condition upon the reception of signal waves in said coded combination, said gaseous discharge tube, when in said first state isolating its respective diode from signals other than its discrete frequency, for absolutely maintaining the condition of its respective diode, as applied to said detection means, time delay means with each of said discharge tubes to maintain the signal responsive condition in the associated diode upon any tube discharge for at least the duration period of transmission of said coded discrete frequency combination as successive signal waves, said time delay means including circuit means for automatically returning its associated discharge tube to its first state, within said duration period.

2. Selective receiver circuitry as claimed in claim 1, in which said time delay means includes a resistor in series between each said discharge tube and said biasing means and a condenser in shunt between each tube at its said resistor side and signal ground with the extinguishing potential corresponding to the charge on said capacitor.

References Cited by the Examiner

UNITED STATES PATENTS

| | | | |
|---|---|---|---|
| 2,052,581 | 9/36 | Richards | 340—171 |
| 2,173,154 | 9/39 | Bernard | 340—171 |
| 2,184,075 | 12/39 | Goldstein | 340—171 |
| 2,497,656 | 2/50 | Clarke | 340—171 |
| 2,524,782 | 10/50 | Ferrar et al. | 340—171 |
| 2,547,024 | 4/51 | Noble | 340—171 |
| 2,553,910 | 5/51 | Gaffney et al. | 340—171 |
| 2,557,729 | 6/51 | Eckert | 307—88.5 |
| 2,666,196 | 1/54 | Kinsley et al. | 340—171 |
| 2,701,279 | 2/55 | Lovell et al. | 340—171 |
| 2,794,972 | 6/57 | Dimmer | 340—171 |
| 2,811,708 | 10/57 | Byrnes | 340—171 |

FOREIGN PATENTS

| | | |
|---|---|---|
| 442,283 | 2/36 | Great Britain. |
| 316,041 | 3/34 | Italy. |

NEIL C. READ, *Primary Examiner.*

STEPHEN W. CAPELLI, *Examiner.*